(12) United States Patent
Ikeda

(10) Patent No.: US 6,240,244 B1
(45) Date of Patent: May 29, 2001

(54) DISK APPARATUS HAVING A SINGLE RECORDING HEAD AND CAPABLE OF SIMULTANEOUS RECORDING AND REPRODUCING

(75) Inventor: Kenichi Ikeda, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/044,259

(22) Filed: Mar. 19, 1998

(30) Foreign Application Priority Data

Mar. 19, 1997 (JP) .................................................. 9-066370

(51) Int. Cl.[7] .................................................. H04N 5/781
(52) U.S. Cl. .............................................. 386/125; 386/82
(58) Field of Search .................................. 386/35, 45–46, 386/112, 68, 72, 82, 91–92, 109, 124, 125, 126; 369/32, 59, 47; 360/55, 13; H04N 5/783, 5/781

(56) References Cited

U.S. PATENT DOCUMENTS

| | | | |
|---|---|---|---|
| 5,343,452 | * 8/1994 | Maeda et al. | 369/32 |
| 5,371,551 | * 12/1994 | Logan et al. | 386/112 |
| 5,436,875 | 7/1995 | Shinada | 369/32 |
| 5,438,423 | * 8/1995 | Lynch et al. | 386/109 |
| 5,526,132 | * 6/1996 | Tsubota et al. | 360/13 |
| 5,831,955 | * 11/1998 | Arataki et al. | 369/59 |
| 6,018,612 | * 1/2000 | Thomason et al. | 386/125 |

FOREIGN PATENT DOCUMENTS

0544299 A2   6/1993   (EP) .

\* cited by examiner

*Primary Examiner*—Wendy R. Garber
*Assistant Examiner*—Vincent F. Boccio
(74) *Attorney, Agent, or Firm*—Pillsbury Winthrop LLP

(57) ABSTRACT

A disk apparatus comprises a buffer memory and a controller for alternately recording onto and reproducing from an optical disk in a time sharing manner. During recording onto a recording area of the optical disk, during reproducing from a reproducing area of the optical disk, and during accessing in which an optical head moves between both of the areas for accessing, inputted video data is written into a buffer memory, video data stored in the memory is read and recorded at a speed that is at least twice higher than an average bit rate, and video data recorded on the reproducing area is reproduced at a speed that is at least twice higher than an average bit rate. During reproducing and during accessing in which the optical head is moved between both areas for accessing, digital continuous data stored in the memory is read and outputted, at a predetermined bit rate, to a monitor.

20 Claims, 5 Drawing Sheets

FIG. 4B   (1)  (2)  (3)  (4)  (5)  (6)  (7)

DISK APPARATUS HAVING A SINGLE RECORDING HEAD AND CAPABLE OF SIMULTANEOUS RECORDING AND REPRODUCING

BACKGROUND OF THE INVENTION

The present invention relates to a disk apparatus for recording and reproducing digital continuous data such as video data or audio data, and more particularly, to a video disk apparatus for alternately recording and reproducing data by time sharing.

Developments have been made to a video disk apparatus for recording and reproducing a digital video image into and from a storage medium, such as an optical disk or the like, using video compression, such as a Moving Picture Experts Group (MPEG) method.

According to a video disk apparatus using a conventional optical disk, digital video data compressed by MPEG encoder as a digital video compressor or digital video data supplied by broadcasting or CATV (cable television) is once stored into a buffer memory in which an adjustment is made on a difference between the bit rate (which means the bit capacity transferred per second) of the digital video data inputted and the recording/reproducing speed (which means the bit capacity recorded/reproduced per second) of an optical disk. Normally, the bit rate of inputted digital video data is slower than the recording/reproducing speed of an optical disk.

As for a practical form of using such a video disk apparatus, it will be very advantageous for practical use if a video image once recorded can be reproduced during recording. For example, a user who comes back home while a program is being recorded by a recorder that had been set by a timer may wish to watch the program from the beginning while the program is still being recorded.

However, in a conventional video disk apparatus, a video image can be reproduced only after the recording of the image is completed. Thus, it is not possible to simultaneously reproduce a video image while recording the video image. In order to solve this problem, a conventional apparatus comprises independent optical heads for recording and reproducing, respectively, thereby to realize a simultaneous recording/reproducing function. This method, however, results in an increase in costs since a plurality of optical heads are used.

BRIEF SUMMARY OF THE INVENTION

The present invention has an object of providing a video disk apparatus capable of reproducing a portion of digital continuous data which has already been recorded during recording of digital continuous data such as video data, audio data, or the like, using a single recording/reproducing head.

According to the present invention, there is provided a disk apparatus comprising a continuous data input/output section for inputting and outputting digital continuous data at a first bit rate, a recording/reproducing section for recording and reproducing the continuous data in and from a disk-like recording medium, a buffer memory for temporarily buffering input digital continuous data and for temporarily buffering time-based digital data reproduced from the recording medium, and a control section for controlling recording of time-based digital data onto a predetermined recording area on the recording medium and reproducing of digital continuous data from a predetermined reproducing area on the recording medium so as to be performed alternately in a time-sharing manner.

The control section executes the following control:

(a) Writing in a recording buffer memory digital data inputted during recording onto a recording area, during reproducing into a reproducing area, and during an access time period for which a recording/reproducing head is moved between a recording and a reproducing area for accessing.

(b) Reading and recording digital data buffered in the recording buffer memory, at a recording speed which is twice or more greater than an average bit rate of digital data inputted, into a recording area, during recording onto the recording area.

(c) Reproducing and writing digital continuous data recorded in a reproducing area, at a recording speed which is twice or more greater than the average bit rate, into a reproducing buffer memory, during reproducing from the reproducing area.

(d) Reading and outputting digital data buffered in the reproducing buffer memory during recording onto a recording area, during reproducing into a reproducing area, and during an access time period for which the recording/reproducing head is moved between a recording and a reproducing area for access, to a continuous data output device.

The recording speed is set to (T1+T2+2S)A/T1 bps or higher, the reproducing speed is set to (T1+T2+2S)A/T2 bps or higher, and the total sum of the memory capacities of the recording buffer memory and the reproducing buffer memory is set to (4S+T1+T2)A bits or more, where an average recording time period is T1 seconds for every time of recording, an average reproducing time period is T2 seconds for every time of reproducing, a maximum access time period of the recording medium (determined by adding a time period required for rotating the recording medium by one rotation, to a seek time period for moving the recording/reproducing head from the innermost circumference of the recording medium to the outermost circumference thereof) is S seconds, and the average bit rate of digital data inputted is A (bps), when recording onto a recording area and reproducing from a reproducing area are alternately performed.

Further, a display screen of a display device as the continuous data output device is divided into two areas for simultaneously displaying a digital video image of digital continuous data being recorded onto a recording area and a digital video image reproduced from a reproducing area.

The disk apparatus of the present invention reproduces digital continuous data which has already been recorded, during recording digital continuous data.

The present invention may have an average bit rate of digital continuous data A (bps) and the maximum access time period of a disk-like recording medium (determined by adding a time period for rotating the recording medium by one rotation, to a seek time period for moving the recording/reproducing head from the innermost circumference of the recording medium to the outermost circumference thereof) is S seconds.

To simultaneously carry out recording of digital video data and reproducing of digital continuous data which has already been recorded on the recording medium using one single recording/reproducing head, recording and reproducing with respect to the recording medium is performed in a time sharing manner, at a speed which is not lower than the average bit rate of two pieces of digital continuous, one being recorded and the other being reproduced. Specifically, recording of digital continuous data onto the recording medium is performed in a certain time period, while reproducing of digital continuous data from the recording medium is performed in another certain time period. Therefore, the recording/reproducing speed of the recording medium is at least 2A (bps) or higher, in order to process digital video data at an average bit rate A (bps).

Further, since one recording/reproducing head is used and the positions of recording and reproducing areas are not always equal to each other, switching between recording and reproducing takes an access time period for moving the head between both of the areas. For example, when a time sharing procedure includes "recording for T1 seconds", "accessing for S seconds from a recording area to a reproducing area", "reproducing for T2 seconds", and "accessing for S seconds from a reproducing area to a recording area" is repeated to perform recording and reproducing, two accesses are made between areas in one cycle of the time sharing procedure.

Accordingly, during recording, inputted digital continuous data of an amount equivalent to (T1+T2+2S) seconds is recorded in T1 seconds, so that the recording speed of the recording medium is (T1+T2+2S)A/T1 bps or higher. Likewise, the reproducing speed is (T1+T2+2S)A/T1 bps or higher. Where T1=T2 is satisfied, the recording/reproducing speed of the recording medium is (2+2S/T1)A (bps) or higher. 2S/T1A (bps) is an increment required for two accesses.

Meanwhile, the capacity of the recording buffer memory is determined by multiplying the sum of twice the access time period (for the recording/reproducing head to reciprocate between a recording area and a reproducing area) and the average reproducing time period T2 by the average transfer speed of video data, and is (2S+T2)A bits or more. Likewise, the capacity required for the reproducing buffer memory is determined by multiplying the sum of twice the access time period (for the recording/reproducing head to reciprocate between a reproducing area and a recording area) and the average recording time period T1 onto the recording medium by the average transfer speed of video data, and is (2S+T1)A bits or more.

When the recording/reproducing speed and the buffer memory capacities satisfy requisites as described above, the following operation is performed. During recording of digital video data, the recording/reproducing head is moved for S seconds to access a reproducing area from a recording area, digital video data is reproduced from the recording medium for T2 seconds on average, digital video data to be recorded while the head is moved to access a radius position of the recording area where data is to be subsequently recorded is stored for S seconds into the recording buffer memory, and digital video data is read from the recording buffer memory and is written into the recording medium for subsequent T1 seconds on average.

Meanwhile, during reproducing of digital video data, digital video data is reproduced from the recording medium on average and is stored into the reproducing buffer memory for T2 seconds, the head is moved for S seconds to access a recording area from a reproducing area, digital video data is recorded onto the recording medium for T1 seconds on average, and the optical head is moved for S seconds to access a radius position of a reproducing area where data is to be recorded subsequently, from the recording area. Digital continuous data to be reproduced during two access time periods and during recording onto the recording medium is reproduced by reading digital continuous data stored in the reproducing buffer memory.

By repeating the operation as described above, digital continuous data inputted from outside is continuously recorded onto the recording medium without data fallout, and digital continuous data to be reproduced from the recording medium is continuously reproduced without data fallout. Therefore, recording and reproducing of digital continuous data can be performed by one single recording/reproducing head.

In case of performing a retry upon a failure of seeking, the recording speed of digital continuous data onto the recording medium may be (T1+T2+2S(N+1))A/T1 (bps) or higher, the reproducing speed of digital continuous data from the recording medium may be (T1+T2+2S(N+1))A/T2 (bps), and the total of memory capacities of the recording and reproducing buffer memories may be (4S(N+1)+T1+T2)A bits or more, where an average recording time period is T1 seconds for every time of recording, an average reproducing time period is T2 seconds for every time of reproducing, a maximum access time period of the recording medium (determined by adding a time period for rotating the recording medium by one rotation, to a seek time period for moving the recording/reproducing head from the innermost circumference of the recording medium to the outermost circumference thereof) is S seconds, the average bit rate of digital data inputted is A (bps), and the maximum number of times for which retries are carried out is N, when recording onto a recording area and reproducing from a reproducing area are alternately performed.

In addition, the screen of the display device as the continuous data output section may be divided into two areas to simultaneously display digital video data as digital continuous data being recorded and digital video data being reproduced. In this manner, a recording image and a reproducing image can be confirmed simultaneously.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A and 4B are graphs showing changes in digital video data amount in a buffer memory according to the embodiment of the present invention of FIG. 1;

DETAILED DESCRIPTION OF THE PREFERRED EMBODIMENT

In the following, an embodiment of the present invention is explained with reference to the drawings.

Figure 1:
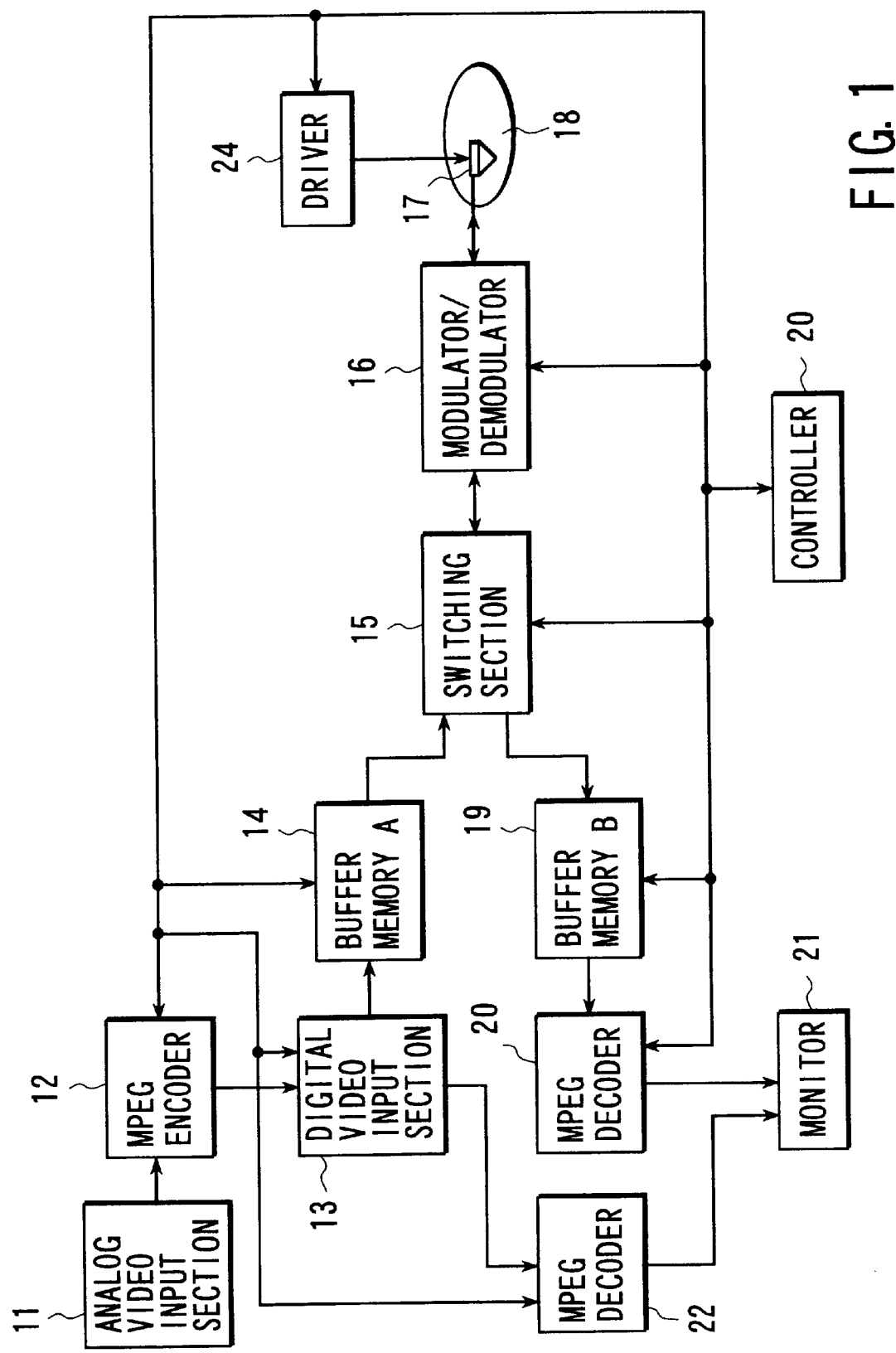
FIG. 1 is a block diagram showing a video disk apparatus according to an embodiment of the present invention.

FIG. 1 is a block diagram showing a video disk apparatus according to an embodiment of the present invention. The video disk apparatus comprises an analog video input section 11, a digital video data compressor 12 (such as an MPEG encoder), a digital video input section 13, a recording buffer memory 14, a switch 15, a modulator/demodulator 16, an optical head 17, a recordable/reproducible medium 18, a reproducing buffer memory 19, a digital video data decompressor 20 (such as an MPEG decoder), a monitor 21 for displaying a reproduced image or both of a reproduced image and a recorded image, a digital video data decompressor 22 (such as a MPEG decoder) for decompressing a recorded image, and a controller 23 for controlling respective sections. The recordable and reproducible medium 18 may be, for example, an optical disk, a phase change recording medium, a magneto-optic recording medium, or the like. The optical head 17 may be, for example, a conventional optical head comprising a semiconductor laser, an objective lens, and image sensor, and the like.

The following description describes the processing of digital video data as an illustrative example. However, the data may be analog, and is not limited to video data. For example, the data may be audio.

In an illustrative example of the present invention, the bit rate of digital video data supplied by the MPEG encoder 12, CATV, or satellite broadcast is 4 Mbps on average. The recording/reproducing speed of digital video data achieved by the optical disk 18 is 12 Mbps. Each of the recording buffer memory 14 and the reproducing buffer memory 19 preferably has a capacity of 6 Mbits.

Figure 2:
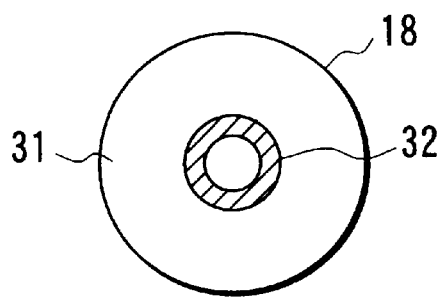
FIG. 2 is a view showing a recording area and a reproducing area on an optical disk according to the embodiment of the present invention of FIG. 1.

FIG. 2 is a view showing a recording area and a reproducing area on the optical disk 18 according to the present invention. Further, as shown in FIG. 2, the optical disk 18 is divided into a recording area 31 in which digital video data is recorded and a reproducing area 32 from which digital video data is reproduced.

Referring again to FIG. 1 an explanation is made of simultaneous processing of recording and reproducing of digital video data according to the embodiment of the present invention. As an overview, received video data is continuously written into the recording buffer memory 14 and intermittently read from the recording buffer memory 14 and recorded on the optical disk 18. During movement of the optical head 17 (accessing of different areas of the optical disk 18), data is stored in the recording buffer memory 14. Likewise, during reproduction, data is reproduced from the optical disk 18 and stored in the reproducing buffer memory 19. Data is read continuously from the reproducing buffer memory 19 and outputted for display on the monitor 21, even during movement of the optical head 17.

Recording operation is firstly explained below. When a video data signal inputted is an analog video signal, such as a NTSC signal, the analog video signal is applied by the analog video input section 11 to the MPEG encoder 12, and is subjected to digital conversion and video compression. Thereafter the signal is inputted to the digital video input section 13. On the other hand, when the video data signal is digital video data that has already been compressed, the digital video data is directly inputted to the digital video input section 13. Such digital video data may be supplied by, for example, CATV, satellite broadcast, or the like.

Digital video data inputted through the digital video input section 13 is written into the recording buffer memory 14 at a first bit rate (4 Mbps, for example) under the control of the controller 23. When a certain amount of digital video data is written into the recording buffer memory 14, digital video data is read from the recording buffer memory 14 at a second bit rate (12 Mbps for example) corresponding to the recording speed of the optical disk 18 and is input to the switch 15. The controller 23 controls the switch 15 to input digital video data from the recording buffer memory 14 into the modulator/demodulator 16 during recording and to input digital video data outputted from the modulator/demodulator 16 into the recording buffer memory 14.

The digital video data is applied to the modulator/demodulator 16 by the switch 15, and is thereby modulated into a signal suitable for recording. The signal is provided to the optical head 17, and is recorded onto the optical disk 18 by the optical head 17. During this time, the seek operation of the optical head 17 and the driving of the semiconductor laser are controlled by the controller 24 via the driver 24.

The recording speed of the optical disk 18 is faster than the bit rate of digital video data inputted through the digital video input section 13, so that the recording buffer memory 14 is sometimes empty. In this case, recording onto the optical disk 18 is stopped and processing is repeated, starting from the operation of storing digital video data into the recording buffer memory 14. Therefore, inputting of digital video data is performed sequentially, while recording of digital video data onto the optical disk 18 is performed intermittently since digital video data is intermittently read from the recording buffer memory 14. The controller 23 controls timings at which the video data is written in and read out from the buffer memory 14 while supervising a file allocation table (FAT) (not shown) indicating the amount of data stored in the buffer memory 14.

For example, when 4 Mbits or more of digital video data is stored and buffered in the recording buffer memory 14, recording is performed onto the optical disk 18. When 4 Mbits of data is buffered in the recording buffer memory 14, digital video data from the digital video input section 13 is written into the recording buffer memory 14 at a speed of 4 Mbps while digital video data is read from the recording buffer memory 14 at a speed of 12 Mbps. Therefore, the recording buffer memory 14 becomes empty in about 0.5 seconds=4 Mbits/(12 Mbps−4 Mbps), and recording onto the optical disk 18 is then stopped. In a subsequent one second, the recording buffer memory 14 buffers 4 Mbits, and then, recording onto the optical disk 18 is performed again.

Thus, recording onto the optical disk 18 is sometimes stopped, and reproducing is performed using the periods in which recording is thus stopped. During reproducing, and while accessing a reproducing area 32 from a recording area 31 and while accessing the recording area 31 from the reproducing area 32, digital video data that is inputted into the digital video input section 13 is written into the recording buffer memory 14 at a speed of 4 Mbps.

Next, a reproduced signal reproduced from the optical disk 18 by the optical head 17 is demodulated into digital video data by the modulator/demodulator 16. Digital video data thus demodulated is written into the reproducing buffer memory 19 at a speed of 12 Mbps, through the switch 15. Simultaneously, digital video data is read from the reproducing buffer memory 19 at a speed of 4 Mbps and is decoded by the MPEG decoder 20, for application to the monitor 21.

The reproducing speed of the optical disk 18 is faster than the bit rate of digital video data, so that the reproducing buffer memory 19 sometimes becomes full. Then, reproducing is stopped until the digital video data stored in the buffer memory 19 decreases to a proper amount. During this time, the controller 23 holds the address information of the recording area from which the reproduction is interrupted, and restarts the seek operation on the basis of the held address information when the reproduction is started again. Therefore, reproducing of digital video data from the reproducing buffer memory 19 is sequentially performed, while reproducing of digital video data from the optical disk 18 is performed intermittently.

For example, when digital video data stored in the reproducing buffer memory 19 decreases to 2 Mbits or less, reproducing from the optical disk 18 is performed. In this case, while digital video data is written into the reproducing buffer memory 19 at a speed of 12 Mbps, digital video data is read from the reproducing buffer memory 19 at a speed of 4 Mbps and is inputted into the MPEG decoder 20. Therefore, the reproducing buffer memory 19 becomes full in about 0.5 seconds, i.e., 2 Mbits+(12 Mbps−4 Mbps)0.5 sec.=6 Mbits. Then, reproducing is stopped. In a subsequent one second, the reproducing buffer memory 19 decreases to 2 Mbits, and digital video data is reproduced again from the optical disk 18.

Thus, reproducing from the optical disk 18 is sometimes stopped during operation, and recording is performed during the periods in which reproducing is stopped. During recording, digital video data stored in the reproducing buffer memory 19 while accessing a recording area 31 from a reproducing area 32 and while accessing the reproducing area 32 from the recording 31 is read at a speed of 4 Mbps, and is inputted to the MPEG decoder 20.

Figure 3:
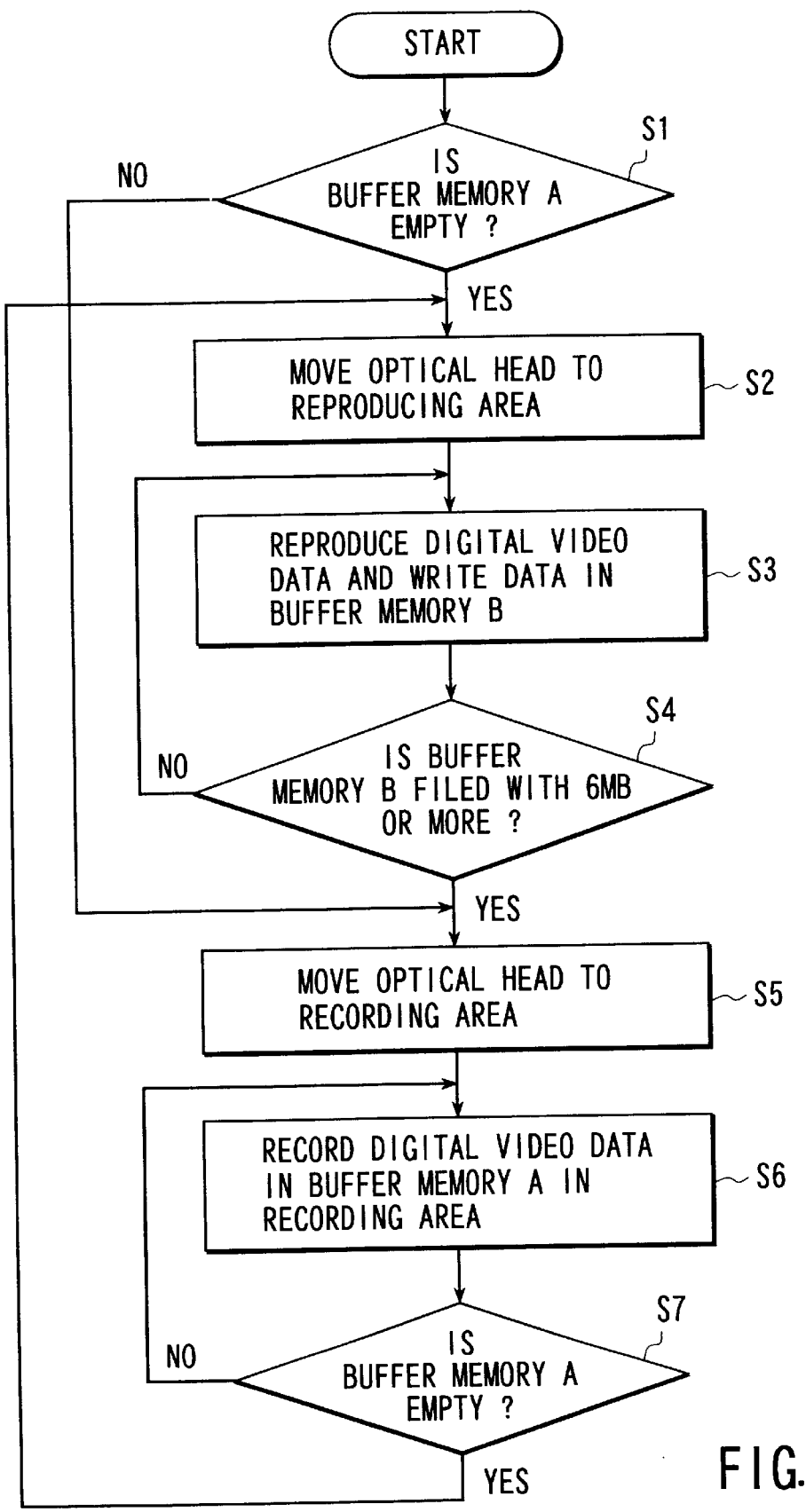
FIG. 3 is a flowchart showing a processing procedure of recording/reproducing digital video data according to the embodiment of the present invention of FIG. 1.

FIG. 3 is a flowchart showing a processing procedure of simultaneous recording/reproducing of digital video data according to an embodiment of the present invention.

The controller 23 determines whether digital video data remains in the recording buffer memory 14 (or buffer memory A) (step S1). If the recording buffer memory 14 is empty, recording onto the optical disk 18 is stopped, and the driver 24 moves the optical head 17 to a reproducing area 32 (FIG. 2) in order to perform reproducing from the optical disk 18 (step S2). The optical head 17 reproduces digital video data recorded in the reproducing area 32 and transfers it to the reproducing buffer memory 19 (or buffer memory B) via the modulator/demodulator 16 and switch 15 to store the reproduced video data in the reproducing buffer memory 19 (step S3).

Next, a confirmation is made of whether 6 Mbits of digital video data has been stored the reproducing buffer memory 19, i.e., whether the reproducing buffer memory 19 is full (step S4). If the reproducing buffer memory 19 is not full, reproduced video data is stored in the reproducing buffer memory 19 at step S3. Otherwise, if the reproducing buffer memory 19 is full, reproducing from the optical disk 18 is stopped, and the optical head 17 is moved to a recording area 31 in order to perform recording onto the optical disk 18 (step S5). Digital video data in the recording buffer memory 14 is recorded onto the optical disk 18 until the buffer memory 14 becomes empty (steps S6 to S7).

Subsequently, when the buffer memory 14 is empty (step S7), the operation returns to the step S2 and recording and reproducing are alternately repeated with respect to the optical disk 18, as described above.

Figure 4A:
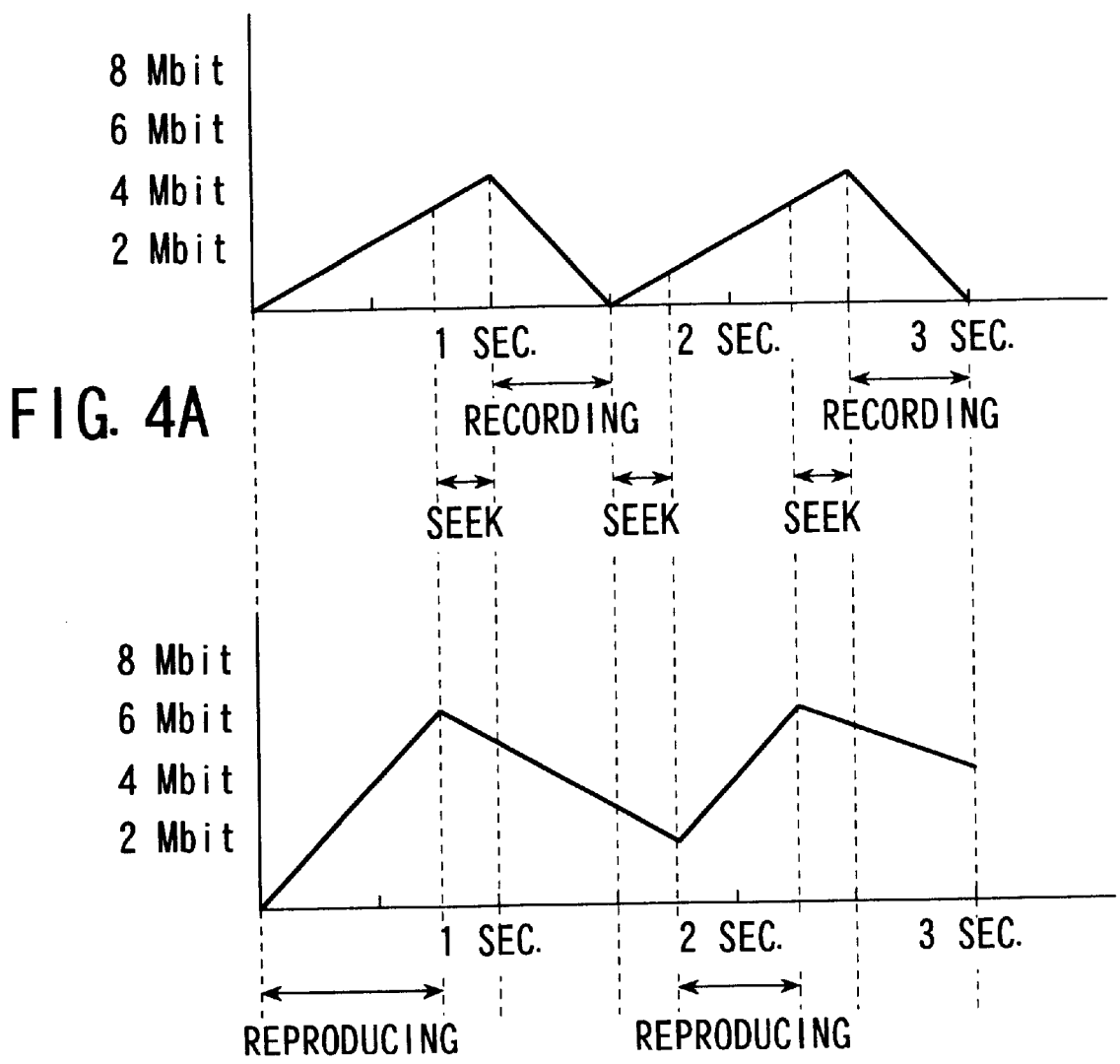

FIGS. 4A and 4B are graphs showing time-based changes of the amounts of digital video data in the recording buffer memory 14 and the reproducing buffer memory 19, in the simultaneous recording/reproducing according to the embodiment of the present invention. In this example, the average access time period between a recording area 31 and a reproducing area 32 is about 0.25 seconds. In addition, the optical head 18 is positioned in the reproducing area 32. With reference to the graphs, operation during simultaneous recording/reproducing according to the embodiment of the present invention is explained.

(1) Firstly, as shown in FIG. 4B, since the amount of digital video data in the reproducing buffer memory 19 is 0 (i.e., the buffer 19 is empty), digital video data is reproduced for 0.75 seconds at a rate of 12 Mbps from the optical disk 18, and is written into the reproducing buffer memory 19.

In the period of 0.75 seconds, while writing digital video data reproduced from the optical disk 18 into the reproducing buffer memory 19, digital video data is read from the reproducing buffer memory 19 at a speed of 4 Mbps and is outputted to the MPEG decoder 20, so that the amount of digital video data which remains in the reproducing buffer memory 19 after this period is (12 Mbps−4 Mbps)0.75 sec.=6 Mbits.

Further, since recording onto the optical disk 18 is not performed during the period of 0.75 seconds, digital video data of (4 Mbps)0.75 sec.=3 Mbits is written into the recording buffer memory 14 from the digital video input section 13, as shown in FIG. 4A.

(2) In the subsequent 0.25 seconds, accessing is performed by moving the optical head 17 from the reproducing area 32 to the recording area 31. During the accessing, neither recording nor reproducing is performed with respect to the optical disk 18, so that digital video data in the recording buffer memory 14 increases to 3 Mbits+(4 Mbps) 0.25 sec.=4 Mbits (FIG. 4A), and digital video data in the reproducing buffer memory 19 decreases to 6 Mbits−(4 Mbps) 0.25 sec.=5 Mbits (FIG. 4B).

(3) In the subsequent 0.5 seconds, while digital video data is written into the recording buffer memory 14 at a speed of 4 Mbps, digital video data is read from the recording buffer memory 14 at a speed of 12 Mbps and is recorded onto the optical disk 18. After the 0.5 seconds elapse, the digital video data in the recording buffer memory 14 is empty, or 4 Mbits−(12 Mbps−4 Mbps)0.5 sec.=0 (FIG. 4A).

In the 0.5 seconds, reproducing from the optical disk 18 is not performed, so that digital video data stored in the reproducing buffer memory 19 is sent to the MPEG decoder 20 at a speed of 4 Mbps, and the digital video data in the buffer memory 19 decreases to 5 Mbits−(4 Mbps)0.5 sec.=3 Mbits (FIG. 4B).

(4) In the subsequent 0.25 seconds, accessing is performed by moving the optical head 17 from the recording area 31 to the reproducing area 32. During the accessing, neither recording nor reproducing is performed with respect to the optical disk 18, so that digital video data in the recording buffer memory 14 increases to (4 Mbps)0.25 sec.=1 Mbits (FIG. 4A), and digital video data in the reproducing buffer memory 19 decreases to 3 Mbps−(2 Mbps)0.25 sec.=2 Mbits (FIG. 4B).

(5) In the subsequent 0.5 seconds, digital video data is reproduced, following the preceding reproducing from the optical disk 18, and is written into the reproducing buffer memory 19 at a speed of 12 Mbps (FIG. 4B).

In the 0.5 seconds, digital video data is read from the reproducing buffer memory 19 at a speed of 4 Mbps, and is outputted to the MPEG decoder 20, so that digital video data which remains in the reproducing buffer memory 19 is 2 Mbits+(12 Mbps−4 Mbps)0.5 sec.=6 Mbits (FIG. 4B).

Meanwhile, in the 0.5 seconds, recording onto the optical disk 18 is not performed, so that digital video data of 1 Mbits+(4 Mbps)0.5 sec.=3 Mbits is written into the recording buffer memory 14 from the digital video input section 13 (FIG. 4A).

(6) In the subsequent 0.25 seconds, accessing is performed by moving again the optical head 17 from the reproducing area 32 to the recording area 31. During the accessing, neither recording nor reproducing is performed with respect to the optical disk 18, so that digital video data in the recording buffer memory 14 increases to 3 Mbits+(4 Mbps)0.25 sec.=4 Mbits (FIG. 4A), and digital video data in the reproducing buffer memory 19 decreases to 6 Mbits−(4 Mbps) 0.25 sec.=5 Mbits (FIG. 4B).

(7) In the subsequent 0.5 seconds, while digital video data is written into the recording buffer memory 14 at a speed of 4 Mbps, digital video data is read from the recording buffer memory 14 at a speed of 12 Mbps and is recorded onto the optical disk 18. After the 0.5 seconds elapse, the digital video data in the recording buffer memory 14 is 4 Mbits−(12 Mbps−4 Mbps)0.5 sec.=0 (FIG. 4A).

In the 0.5 seconds, reproducing from the optical disk 18 is not performed, so that digital video data stored in the reproducing buffer memory 19 is sent to the MPEG decoder 20 at a speed of 4 Mbps, and the digital video data in the buffer memory 19 decreases to 5 Mbits−(4 Mbps)0.5 sec.=3 Mbits (FIG. 4B).

Thereafter, accessing (0.25 seconds) to the reproducing area 32 from the recording area 31, reproducing (0.5 seconds) of digital video data from the optical disk 18, accessing (0.25 seconds) from the reproducing area 32 to the recording area 31, and recording (0.5 seconds) of digital video data onto the optical disk 38 are repeated in this order.

As can be seen from FIGS. 4A and 4B, digital video data in the recording buffer memory 14 does not exceed its buffer memory capacity, and digital video data in the reproducing buffer memory 19 never decreases to 0 except for the starting time of reproducing. This means that recording and reproducing of digital video data are simultaneously performed.

Next, the recording/reproducing speed of the optical disk 18 of this embodiment of the present invention is described below.

The average bit rate of digital video data in this embodiment of the present invention is A=4 bps, and the maximum access time period of the optical disk 18 (which is decided by adding a time period required for rotating the optical disk 18 by one turn, to a seek time period for moving the optical head 17 from the innermost circumference to the outermost circumference) is S=0.25 seconds.

To simultaneously execute recording of digital video data onto the optical disk 18 and reproducing of digital video data recorded on the optical disk 18 using one single optical head 17, recording and reproducing is alternately performed by a time sharing manner, at a speed which is not lower than the average bit rate of digital video data to be recorded and reproduced. Specifically, recording of digital video data onto the optical disk 18 is performed in a time period, while reproducing of digital video data from the optical disk 18 is performed in another time period. Therefore, the recording/reproducing speed of the optical disk 18 is at least 2(4) Mbps =8 Mbps or higher, in order to process digital video data at an average bit rate of 4 Mbps.

Further, since one optical head 17 is used and the positions of the recording and reproducing areas 31 and 32 are not always equal to each other, switching between recording and reproducing includes an access time period for moving the optical head 17 between the areas 31 and 32. For example, when a time sharing procedure including "recording", "accessing", "reproducing", and "accessing" is repeated for recording and reproducing, two accesses are made in one time sharing procedure. Accordingly, during recording, digital video data inputted in a time period between the two accesses is recorded in a recording time period of 0.5 seconds for recording digital video data onto the optical disk 18.

From FIGS. 4A and 4B, the average recording time period for every recording period is 0.5 seconds. The reproducing time period is 0.75 seconds for the first time and is 0.5 seconds for each of the succeeding times, so that the access time period is 0.25 seconds. Therefore, the recording speed of the optical disk 18 is (0.5+0.5+2(0.25))4/0.5 bps=12 Mbps or higher. Likewise, the reproducing speed of the optical disk 18 is (0.5+0.5+2(0.25))4/4 Mbps=12 Mbps or higher. 4 Mbps is an increment of the recording/reproducing speed which is necessary for two accesses. In the embodiment of the present invention, the recording/reproducing speed of the optical disk 18 is 12 Mbps and satisfies the conditions as described above.

Next, the buffer memory capacities for the embodiment of the present invention are described.

At first, the capacity of the recording buffer memory 14 is determined by multiplying the sum of twice the access time period (for the optical head 17 to reciprocate between the recording area 31 and the reproducing area 32) and the average reproducing time period T2 by the average transfer speed of digital video data, and is (2S+T2)A bits or more. In one embodiment of the present invention, the reproducing time period is 0.75 seconds for the first time and is 0.5 seconds for each of the second and later times, from FIGS. 4A and 4B. Therefore, where the average reproducing time period is 0.5 seconds, the capacity of the recording buffer memory 14 is (2(0.25)+0.5)4=4 Mbits or more.

Likewise, the capacity of the reproducing buffer memory 19 is determined by multiplying the sum of twice the access time period (which is required for the optical head 17 to reciprocate between the reproducing area 32 and the recording area 31) and the average recording time period T1 by the average transfer speed of digital video data, and is (2S+T1)A bits or more. In one embodiment of the present invention, the average recording time period is 0.5 seconds, the capacity required for the reproducing buffer memory 19 is (2(0.25)+0.5)4=4 Mbits or more.

Accordingly, a buffer memory capacity is a total of the capacities of the recording buffer memory 14 and the reproducing buffer memory 19, and is 8 Mbits or more. In one embodiment of the present invention, each of the recording buffer memory 19 and the reproducing buffer memory 19 has a capacity of 6 Mbits, and the total capacity is 12 Mbits, thus satisfying the conditions described above.

However, from FIGS. 4A and 4B, it can be seen that the recording buffer memory 14 uses 4 Mbits at most, and therefore, the capacity of the memory 14 may be 4 Mbits. The amount of the area used by the reproducing buffer memory 19 changes to 6 Mbits in the beginning of reproducing, and thereafter, changes to only 4 Mbits at most. Therefore, 4 Mbits may be enough for each of the capacities of the buffer memories 14 and 19, by controlling the memories.

When the recording/reproducing speed and the buffer memory capacities satisfy requisites as described above, the following operation is performed. During recording of digital video data, the optical head 17 is moved to access the reproducing area 32 from the recording area 31. Digital video data is reproduced from the optical disk 18 for 0.5 seconds on average. While the optical head 17 is moved to access a radius position of the recording area 31 where data is to be subsequently recorded, digital video data to be recorded is stored in the recording buffer memory 14. Digital video data is read from the recording buffer memory 14 and is written into the optical disk 18 for subsequent 0.5 seconds on average.

Meanwhile, during reproducing of digital video data, digital video data is reproduced from the optical disk 18 for 0.5 seconds on average and is stored into the reproducing buffer memory 19. The optical head is moved to access the recording area 31 from the reproducing area 32, digital video data is recorded onto the optical disk 18 for 0.5 seconds on average, and the optical head 17 is moved to access a radius position of the reproducing area 32 where data is to be recorded subsequently, from the recording area 31. Digital video data to be reproduced during two access time periods and during recording onto the optical disk 18 is reproduced by reading digital video data stored in the reproducing buffer memory 19.

In the above recording and reproducing operations, the data is recorded or reproduced in units of sectors to ensure the accurate recording and reproducing position on the optical disk, and is written in and read out from the optical disk together with the sector address.

By repeating the operation as described above, digital video data inputted from outside the disk apparatus is continuously recorded onto the optical disk 18 without data fallout, and digital video data to be reproduced from the optical disk 18 is reproduced sequentially without data fallout. Therefore, recording and reproducing of digital video data can be performed by one single optical head 17.

Next, retry upon a failure of seeking is explained below. Movement from a recording area to another recording area on the optical disk 18 may fail, e.g., seeking may fail because address information recorded on the optical disk 18 cannot be read. In this case, seeking is retried for a number of times that is limited by a predetermined number of retries. In consideration of such retries upon a failure of seeking, the capacities of the buffer memories 14 and 19 may be estimated on the condition that the maximum seek time period is (N+1)S seconds, where the bit rate of digital video data is A (bps) and the maximum access time period (defined by adding a time period required for rotating the optical disk 18 by one turn, to the seek time period required for the optical head 17 to seek the outermost circumference of the optical disk 18 from the innermost circumference thereof) is S seconds and the maximum number of times for which retries are performed is N.

Therefore, the recording buffer memory 14 can store digital video data to be recorded and the reproducing buffer memory 19 can store digital video data to be reproduced, even when the optical head 17 retries seeking, if the recording speed of digital video data onto the optical disk 18 is (T1+T2+2S(N+1))A/T1 (bps) or higher, the reproducing speed of digital video data from the optical disk 18 is (T1+T2+2S(N+1))A/T2 (bps), and the total of memory capacities of the buffer memories 14 and 19 is (4S(N+1)+T1+T2)A bits or more. It is apparent that digital video images can be reproduced without data fallout.

Figure 5:
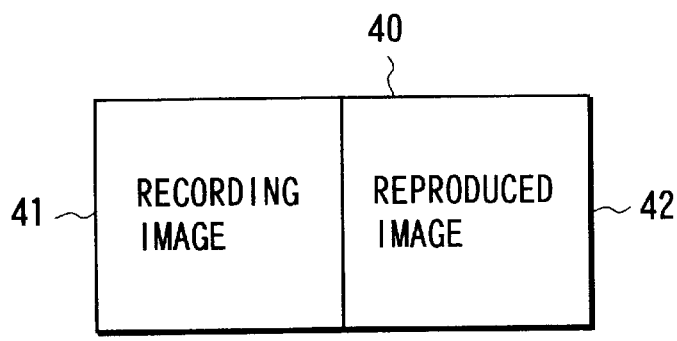
FIG. 5 is a view showing a display example according to the embodiment of the present invention of FIG. 1.

FIG. 5 shows an example of an image displayed on the monitor 21 according to the embodiment of the present invention. A screen 40 is divided into two areas for simul- taneously displaying a recording image 41 and a reproducing image 42, respectively. In this manner, a video image already recorded can be reproduced as a reproducing image 42 while monitoring the recording image 41 to confirm whether recording is properly performed and what image is being recorded presently.

The embodiment of the present invention is arranged such that data of a recorded video image is inputted through the MPEG decoder 22 from the digital video input section 13. However, when inputted video data includes analog signals, the analog signals can be directly inputted into the monitor 21 without passing through the MPEG decoder 22.

In the embodiment as described above, for example, when a digital video image is recorded by a manner of preservation recording or the like, it is possible to reproduce the portion of a digital video that has been recorded, from the start position of the recording (or recording start time point) while continuing the recording. Therefore, if a user preserves recording of a program A from 7:00 pm to 8:00 pm, the user can reproduce and watch the program A from the beginning even when the user comes home at 7:10 pm (according to a time-shift function).

In this case, since the average bit rate of video data is the same in both cases of recording and reproducing, a difference of 10 minutes exists on the time axis between the recording position and the reproducing position, in the above example. Therefore, the user finishes watching the program A at 8:10 pm.

Figure 7A:
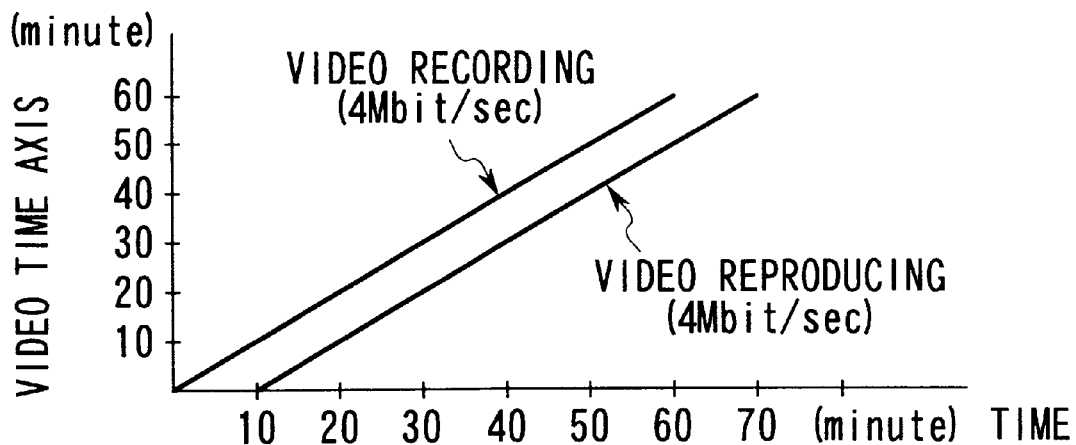
FIGS. 7A and 7B show time relations of video recording and reproducing operations.

FIG. 7A shows the above example. Specifically, supposing that the bit rate is 4M bps in both cases of recording and reproducing, a portion of a video image for 10 minutes has been recorded at the time when reproducing is started with a delay of 10 minutes. From the Figure, it will be known that a difference of 10 minutes is continuously maintained on the time axis between the recording and the reproducing. For example, after 60 minutes from the start of recording, a portion of a video image for 50 minutes has been reproduced, and thus, there is a time difference of 10 minutes between the image being reproduced and the image being recorded.

Explanation will be made of a case that a user starts reproducing the program A with a delay of 10 minutes and the reproducing finishes at the same time as the recording of the program, i.e., the case that reproducing of a video image catches up with recording thereof.

In this case, the average bit rate of a video image during reproducing is set to be higher than that during recording. For example, the average bit rate of a digital video image to be recorded is set to 4M bps, and the video data which takes 60 minutes to be recorded must be reproduced in 50 minutes. Therefore, the bit rate during reproducing is set to 4.8M bps=60(sec)*10*4M(bps)/50(sec) 10.

Figure 7B:
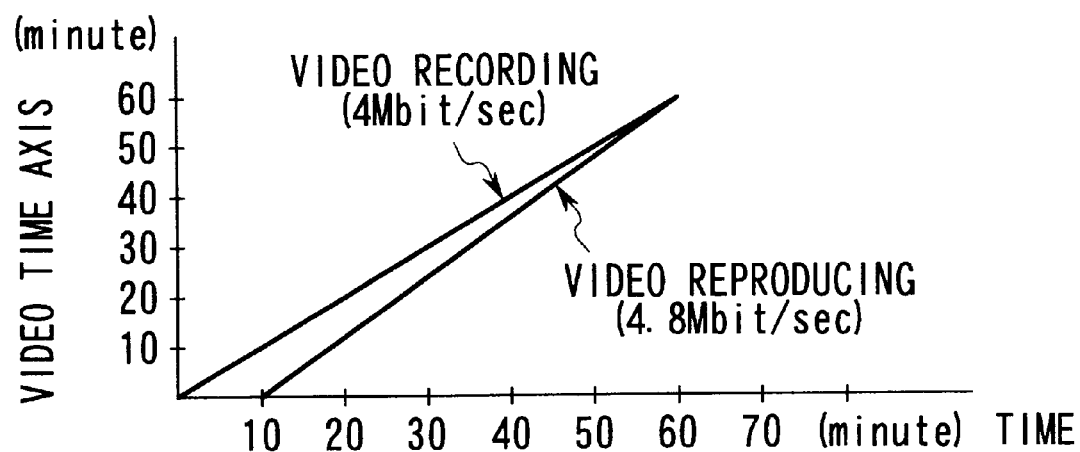

Accordingly, where the average bit rate of a digital video image to be recorded is 4M bps, the reproducing position on the disk coincides with the recording position at 8:00 pm if reproducing is carried out with the average bit rate of a digital video image during reproducing being set to 4.8M bps. Thus, the position (or time axis) of the video image being recorded and the position (or time axis) of the video image being reproduced coincides with each other. In other words, the reproducing catches up with the recording. FIG. 7B shows this case. Specifically, the average bit rate during recording is set to 4M bps while the average bit rate during reproducing is set to 4.8M bps. On this condition, recording for 10 minutes on the video time axis has been made when the reproducing is started with a delay of 10 minutes. Since the bit rate of recording is higher than that of reproducing, the time positions of recording and reproducing coincide with each other when 60 minutes pass on the video time axis.

After the coincidence, if the average bit rate of the digital video image is kept at 4.8M bps, no recorded portion is reproduced, and therefore, reproducing may be stopped and a digital image being broadcasted may be watched on real time or the digital video image being recorded may be reproduced at the same bit rate as the video image being reproduced.

The recording and reproducing speeds and the buffer capacity which are required for simultaneous recording and reproducing can be easily obtained by calculating the bit rate of the digital video image according to the above embodiment. The structure of the apparatus in this case is the same as that shown in FIG. 1.

It is supposed that the average bit rate of a digital video image to be recorded is A bit/s, the average bit rate of a digital video image is B bit/s, and the maximum access time of the video disk (which is the time obtained by adding a time period required for a video disk to rotate by one turn to a time period required for a recording/reproducing head to perform seeking from the innermost circumference to the outermost circumference) is S seconds. In order to simultaneously perform recording of a digital video image and reproducing of a digital video image already recorded on a disk with use of one recording/reproducing head, recording onto the disk and reproducing therefrom must be carried out in a time-sharing manner, with a speed which is not lower than the average bit rate of the two digital video images being recorded and reproduced. A video image is recorded onto the disk during a certain time period, and a video image is reproduced from the disk during another certain time period. Therefore, in order to process thus two video images, recording/reproducing speed of (A+B) bit/s is required. Further, since only one recording/reproducing head is used, the positions of recording and reproducing areas on the disk are not always equal to each other, so that an access time for moving between both areas to make access is required for switching recording and reproducing. For example, recording and reproducing are performed in a time-sharing manner by repeating a procedure of "recording for T1 seconds", "access for S seconds from a recording area to a reproducing area", "reproducing for T2 seconds", and "access for S seconds from a reproducing area to a recording area" in this order. In this case, access is thus made twice in one procedure according to the time-sharing manner.

Accordingly, during recording, a portion of digital video data inputted for (T1+T2+2S) seconds is to be recorded in a time period of T1 seconds, and the recording speed of a recording medium must be set to (T1+T2+sS)*A/T1 bps or more. Likewise, reproducing speed of the recording medium must be set to (T1+T2+2S)*B/T2 bps or more.

Meanwhile, the buffer capacity required for recording in this case is (2S+T2)*A bit or more which is obtained by multiplying a sum of a twice of the access time (required for an optical head to reciprocate between a recording area and a reproducing area) and the average reproducing time T2 by an average transfer speed of the video image. Likewise, the buffer capacity required for reproducing is (2S+T1)*B bit or more which is obtained by multiplying a sum of a twice of the access time (required for an optical head to reciprocate between a recording area and a reproducing area) and the average reproducing time T1 from the disk by an average transfer speed of the video image. Accordingly, a total buffer capacity of (2S+T2)*A bit+(2S+T1)*B bit or more is required.

If conditions concerning the recording and reproducing speeds of the disk the buffer capacity as described above are satisfied, recording proceeds in a manner in which an optical head makes access in S seconds from a recording area to a reproducing area, a video image is reproduced from the disk for T2 seconds in average, a digital video image to be recorded is stored into a buffer memory in S seconds in which the optical head access to a recording area at a radial position from a reproducing area, and the digital video image is read out from the buffer memory and written into the optical disk in subsequent T1 seconds. The reproducing proceeds in a manner in which the optical head reproduces a video image from the disk for T2 seconds in average, the reproduced video image is recorded into the buffer memory, the optical head access to a recording area from a reproducing area in S seconds, and the optical head subsequently a reproducing area at a radial position from a recording area in S seconds. The digital video image to be reproduced during two access times and during recording onto the disk is reproduced from the buffer memory. The digital video image obtained by repeating the above procedure can be continuously recorded onto the optical disk without a break and the digital video image reproduced from the disk can be continuously reproduced without a break. Further, in case of performing retries up to N times upon a failure of seeking, conditions concerning the recording and reproducing speeds of a recording medium and the buffer capacity can be calculated as follows, supposing that the maximum access time period S is (N+1)S seconds. The recording speed of the medium is set to (T1+T2+2*S*(N+1))*A/T1 bps or more, the reproducing speed of the medium is set to (T1+T2+2*S*(N+1))*B/T2 bps or more, and the total capacity of the recording buffer memory and the reproducing buffer memory is set to (2*S*(N+1)+T2)*A bit+(2*S*(N+1)+T1)*B bit or more.

The above embodiment applies the present invention to the video disk apparatus. However, the present invention can be applied to an audio apparatus as shown in FIG. 6.

Figure 6:
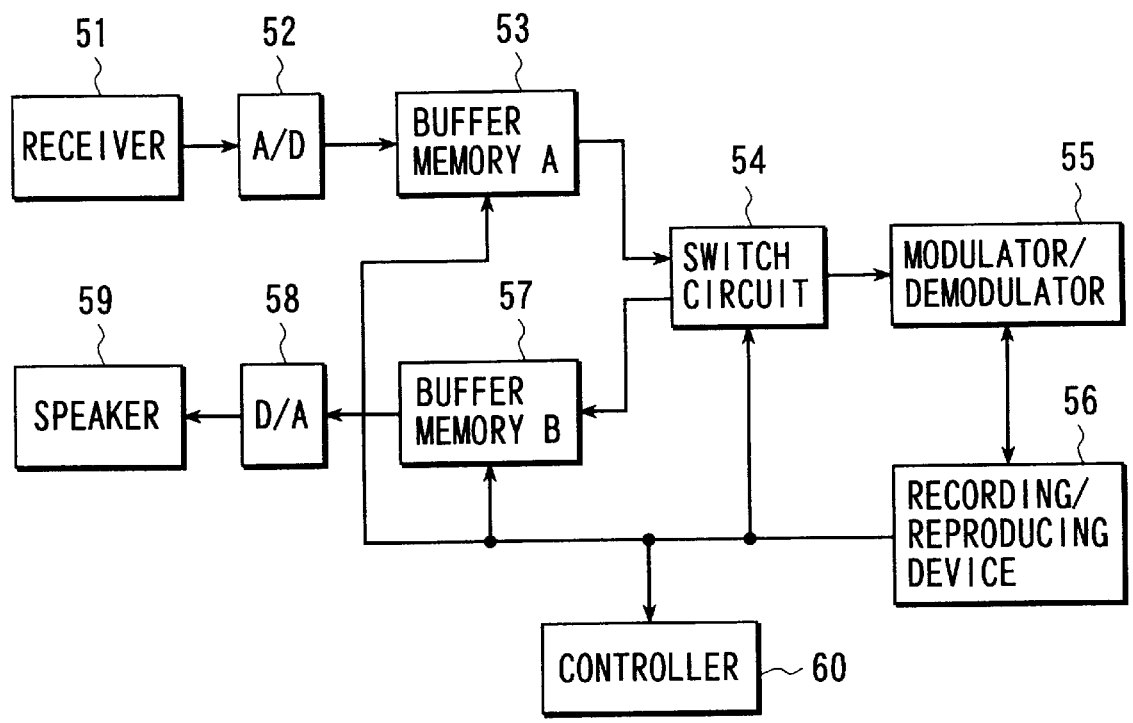
FIG. 6 is a block diagram showing an audio apparatus according to another embodiment of the present invention.

FIG. 6 is a block diagram illustrating an audio apparatus in accordance with yet another embodiment of the present invention. The audio apparatus comprises a receiver 51, an analog-to-digital (A/D) converter 52, a buffer memory 53, a switch 54, a modulator/demodulator 55, a recording/reproducing device 56, a buffer memory 57, a digital-to-analog (D/A) converter 58, a speaker 59, and a controller 60. According to the audio apparatus, in a recording mode, the audio signal output from the receiver 51 is converted into a digital signal by the A/D converter 52, and stored in the buffer memory 53 under control of the controller 60. The digital audio signal read out from the buffer memory 53 is applied to the modulator/demodulator 55 via the switch 54 for conversion to a signal suitable for recording on the recording medium. The output signal of the modulator/demodulator 55 is applied to the recording/reproducing device 56 for recording on the recording medium.

In a reproducing mode, the reproduced audio signal reproduced by the recording/reproducing device 55 is stored in the buffer memory 57 via the modulator/demodulator 55 and the switch 54 under control of the controller 60. The reproduced audio signal read out from the buffer memory 57 is converted to an analog audio signal by the D/A converter 58 and applied to the speaker 59.

In the above audio apparatus, the reproduced audio signal from the buffer memory 57 is supplied to the speaker 59 while the audio signal from the recording buffer memory 53 is recorded on the recording medium by the recording and reproducing device 56 under control of the controller 60.

Accordingly, the audio sound can be continuously output from the speaker 59 even during recording.

Although embodiments of the present invention are described in which data is continuously received and continuously displayed, other variations may be used. For example, data may be continuous in a certain time period. As another example, the data may be received in bursts during a time period. In one embodiment of the present invention, the amount of data received during the time interval is substantially identical to the amount of data displayed.

Although the present invention is described with respect to a recording medium which is an optical disk, other devices may be used that record/reproduce data by a recording/reproducing head using a disk-like recording medium, e.g., a magnetic disk device (or hard disk device) or a floppy disk device. Also, the recording buffer memory 14 and the reproducing buffer memory 19 may be constructed as a single chip semiconductor memory device.

As has been explained above, according to the present invention, recording of digital video data onto a disk-like recording medium and reproducing of digital video data from a disk are alternately repeated, so that reproducing of digital video image already recorded during recording of digital video data can be performed.

Specifically, the recording/reproducing speed with respect to a recording medium is arranged to be higher than a bit rate obtained by adding an access time period required for a recording/reproducing head to reciprocate between a recording area and a reproducing area for accessing, to the sum of a bit rate at which digital video data is recorded and a bit rate at which digital video data is reproduced. The recording section includes a recording buffer memory capable of storing digital video data inputted during reproducing of digital video data from a recording medium and during an access time period required for the recording/reproducing head to reciprocate between a recording area and a reproducing area to access. The reproducing section also includes a reproducing buffer memory capable of storing an amount of digital video data to be transferred to a digital video data decoder during recording of digital video data and during an access time period required for the recording/reproducing head to reciprocate between a recording area and a reproducing area to access. As a result, it is possible to continuously record inputted digital video data without losing the data, and to sequentially reproduce digital video data reproduced from a recording medium also without data fallout.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk apparatus comprising:
    a data input/output section configured to input/output data at predetermined bit rates;
    a recording/reproducing section having a single recording/reproducing head and configured to record data onto and reproduce data from a recording medium;
    a buffer memory configured to temporarily store data to be recorded, and data reproduced from the recording medium; and
    a control section configured to control recording of data onto a predetermined recording area on the recording medium, and reproducing of data from a reproducing area on the recording medium, such that the recording and the reproducing are performed alternately in a time sharing manner,
    wherein the control section controls said recording/reproducing section and said buffer memory such that data to be recorded is written into the buffer memory during recording onto the recording area, during reproducing from the reproducing area, and during accessing in which the recording/reproducing head is moved between the recording area and the reproducing area for accessing,
    data to be recorded, stored in the buffer memory, is read and recorded onto the recording area, at a recording speed defined by $(T1+T2+2S)A/T1$ or more, where $T1$ is an average recording time period per one recording operation, $T2$ is an average reproducing time period per one reproducing operation, $S$ is a maximum access time period necessary for the recording medium which is decided by adding a time period required for rotating the recording medium by one rotation to a seek time period required for the recording/reproducing head to move from an innermost circumference of the recording medium to an outermost circumference thereof, and $A$ is an average bit rate of a digital video image to be recorded,
    data recorded on the recording area is reproduced and written into the buffer memory, at a reproducing speed defined by $(T1+T2+2S)B/T2$ or more, where $B$ is an average bit rate of a digital video image to be reproduced, and
    data to be reproduced, stored in the buffer memory, is read and outputted to a display device, at the predetermined bit rate, during recording onto the recording area, during reproducing from the reproducing area, and during accessing in which the recording/reproducing head is moved between the recording area and the reproducing area for accessing.

2. A disk apparatus according to claim 1, wherein the memory capacity of the buffer memory configured to store data to be recorded and to be reproduced has a capacity defined by at least $(4S+T1+T2)A$ bits.

3. A disk apparatus according to claim 1, further comprising a display screen divided such that data being recorded onto the recording area and data being reproduced are simultaneously displayed.

4. A disk apparatus according to claim 1, wherein the control section sets a memory capacity of the buffer memory configured to store data to be recorded and reproduced, at $(4S+T1+T2)A$ bits or more.

5. A disk apparatus according to claim 4, wherein the control section sets the recording speed at which data is recorded onto the recording medium, to $(T1+T2+2S(N+1))A/T1$ (bps) or higher, and the reproducing speed at which data is reproduced from the recording medium, at $(T1+T2+2S(N+1))A/T2$ (bps) or higher, where $N$ is a maximum number of times of retries to be performed upon a failure of seeking, when recording onto the recording area and reproducing from the recording area are alternately performed in the time sharing manner.

6. A disk apparatus according to claim 4, further comprising a display screen divided such that data being recorded onto the recording area and data being reproduced are simultaneously displayed.

7. A disk apparatus according to claim 1, wherein the control section sets the recording speed at which data is recorded onto the recording medium, at $(T1+T2+2S(N+1))$ A/T1 (bps) or higher, and the reproducing speed at which data is reproduced from the recording medium, at (T1+T2+2S(N+1))A/T2 (bps) or higher, where N is a maximum number of time of retries to be performed upon a failure of seeking, when recording onto the recording area and reproducing from the recording area are alternately performed in the time sharing manner.

8. A disk apparatus according to claim 7, further comprising a display screen divided such that data being recorded onto the recording area and data being reproduced are simultaneously displayed.

9. A disk apparatus according to claim 1, wherein the control section sets a total of memory capacities of the buffer memory configured to store data to be recorded and to be reproduced, to (4S(N+1)+T1+T2)A bits or more, where N is a maximum number of times of retries to be performed upon a failure of seeking, when recording onto the recording area and reproducing from the recording area are alternately performed in the time sharing manner.

10. A disk apparatus according to claim 9, further comprising a display screen divided such that data being recorded onto the recording area and data being reproduced are simultaneously displayed.

11. A disk apparatus according to claim 1, further comprising a display screen divided such that data being recorded onto the recording area and data being reproduced are simultaneously displayed.

12. A disk apparatus comprising:
   a recording/reproducing head configured to record data onto and reproducing data from a recording medium;
   a buffer memory coupled to the recording/reproducing head and configured to temporarily store data to be recorded that is substantially continuously received over a time interval at a first bit rate, and data reproduced from the recording medium; and
   a control section coupled to the recording/reproducing head and the buffer memory and configured to control recording of data onto a recording area on the recording medium, and reproducing of data from a reproducing area on the recording medium, to alternately record and reproduce data in a time sharing manner, and read data reproduced from the recording medium and stored in the buffer memory for display on an external display continuously over said time interval,
   wherein the control section controls said recording/reproducing head to move between the recording area and the reproducing area for accessing and controls said buffer memory to write data that is to be recorded into the buffer memory during recording onto the recording area, during reproducing from the reproducing area, and during accessing, and
   wherein data to be recorded, stored in the buffer memory. is read and recorded onto the recording area, at a recording speed at least twice higher than an average bit rate of the data to be recorded, during recording onto the recording area,
   data recorded on the recording area is reproduced and written into the buffer memory, at a reproducing speed at least twice higher than the average bit rate, during reproducing from the reproducing area, and
   data to be reproduced, stored in the buffer memory is read and outputted to the external display at a second bit rate, during recording onto the recording area, during reproducing from the reproducing area, and during accessing, and
   wherein said control section sets the recording speed at T1+T2+2S)A/T1 bps or higher and the reproducing speed at (T1+T2+2S)A/T2 bps or higher, where T1 is an average recording time period per one recording operation, T2 is an average reproducing time period per one reproducing operation, S is a maximum access time period for the recording medium, and A (bps) is the bit rate of inputted data, when recording onto the recording area and reproducing from the recording area are alternately performed in the time sharing manner.

13. A disk apparatus according to claim 12, wherein the control section sets a total memory capacity of the buffer memory configured to store data to be recorded and to be reproduced, at (4S+T1+T2)A bits or more, when recording onto the recording area and reproducing from the recording area are alternately performed in the time sharing manner.

14. A disk apparatus according to claim 12, wherein the control section sets a total memory capacity of the buffer memory, for storing data to be recorded and to be reproduced, at (4S+T1+T2)A bits or more.

15. A disk apparatus according to claim 14, wherein the control section sets the recording speed at which data is recorded onto the recording medium, to (T1+T2+2S(N+1))A/T1 (bps) or higher, and the reproducing speed at which digital continuous data is reproduced from the recording medium, at (T1+T2+2S(N+1))A/T2 (bps) or higher, where N is a maximum number of times of retries to be performed upon a failure of seeking, when recording onto the recording area and reproducing from the recording area are alternately performed in the time sharing manner.

16. A disk apparatus according to claim 12, wherein the external display is divided to simultaneously display data being recorded onto the recording area and data being reproduced.

17. A disk apparatus for recording and reproducing data on a disk recording medium using a recording/reproducing head, comprising:
   a recording buffer memory configured to temporarily store input data;
   a reproducing buffer memory configured to temporarily store data reproduced from the recording medium; and
   a control unit configured to control alternately, in time sharing, recording of data on a specific recording area on the recording medium and reproducing of data from a specific reproducing area on the recording medium, wherein said control unit
   writes the input data in said recording buffer memory when recording data on the recording area, reproducing data from the reproducing area or accessing said recording/reproducing head between the recording area and the reproducing area;
   reads data stored in said recording buffer memory at a recording speed twice or more than an average bit rate of the input data and records readout data in the recording area, when recording data in the recording area;
   reads data stored in the reproducing area at a reproducing speed twice or more than the average bit rate and records readout data in the reproducing buffer memory when reproducing data from the reproducing area;
   reads data stored in said reproducing buffer memory at a specific bit rate therefrom and outputs readout data to a display when recording data on the recording area, reproducing data from the reproducing area or accessing of said recording/reproducing head between the recording area and the reproducing area;
   said control unit reproduces the data at an average bit rate higher than an average bit rate of the video data, when recording of video data is performed before reproducing of data and equalizes an average bit rate of the reproduced video data to an average bit rate of the input video data, when a reproduction position on the disk coincides with a recording position on the disk or when an input video picture and a reproduced video picture coincides with each other on a time axis: and wherein said control unit sets a recording speed to a value defined by T1+T2+2S)A/T1 or more, and a reproducing speed to a value defined by (T1+T2+2S)B/T2 or more, where T1 is an average recording time period per one recording operation, T2 is an average reproducing time period per one reproducing operation, S is a maximum access time period necessary for the recording medium which is decided by adding a time period required for rotating the recording medium by one rotation, to a seek time period required for the recording/reproducing head to move from an innermost circumference of the recording medium to an outermost circumference thereof, A is an average bit rate of a digital video image to be recorded and B is an average bit rate of a digital video image to be reproduced.

18. A disk apparatus for recording and reproducing data on a disk recording medium using a recording/reproducing head, comprising:

a recording buffer memory configured to temporarily store input data;

a reproducing buffer memory configured to temporarily store data reproduced from the recording medium;

a control unit configured to control alternately, in time sharing, recording of data on a specific recording area on the recording medium and reproducing of data from a specific reproducing area on the recording medium, wherein said control unit writes the input data in said recording buffer memory when recording data on the recording area reproducing data from the reproducing area or accessing said recording/reproducing head between the recording area and the reproducing area;

reads data stored in said recording buffer memory at a recording speed twice or more than an average bit rate of the input data and records readout data in the recording area, when recording data in the recording area;

reads data stored in the reproducing area at a reproducing speed twice or more than the average bit rate and records readout data in the reproducing buffer memory when reproducing data from the reproducing area;

reads data stored in said reproducing buffer memory at a specific bit rate therefrom and outputs readout data to a display when recording data on the recording area reproducing data from the reproducing area or accessing of said recording/reproducing head between the recording area and the reproducing area;

said control unit reproduces the data at an average bit rate higher than an average bit rate of the video data when recording of video data is performed before reproducing of data, and equalizes an average bit rate of the reproduced video data to an average bit rate of the input video data, when a reproduction position on the disk coincides with a recording position on the disk or when an input video picture and a reproduced video picture coincides with each other on a time axis; and wherein the control section sets a total of memory capacities of the buffer memory configured to store digital continuous data to be recorded and to be reproduced, to (2S+T2)A bits+(2S+T1)B bits or more, where T1 is the average recording time period per one recording operation, T2 is the average reproducing time period per one reproducing operation, S (seconds) is the maximum access time period necessary for the recording medium decided by adding a time period required for rotating the recording medium by one turn, to a seek time period required for the recording/reproducing head to move from an innermost circumference of the recording medium to an outermost circumference thereof, A(bps) is an average bit rate of the inputted digital continuous data, and B is an average bit rate of the continuous video data to be reproduced, when recording onto the recording area and reproducing from the recording area are alternately performed in the time sharing manner.

19. A disk apparatus for recording and reproducing data on a disk recording medium using a recording reproducing head, comprising:

a recording buffer memory configured to temporarily store input data;

a reproducing buffer memory configured to temporarily store data reproduced from the recording medium;

a control unit configured to control alternately, in time sharing, recording of data on a specific recording area on the recording medium and reproducing of data from a specific reproducing area on the recording medium, wherein said control unit writes the input data in said recording buffer memory when recording data on the recording area, reproducing data from the reproducing area or accessing said recording/reproducing head between the recording area and the reproducing area;

reads data stored in said recording buffer memory at a recording speed twice or more than an average bit rate of the input data and records readout data in the recording area, when recording data in the recording area;

reads data stored in the reproducing area at a reproducing speed twice or more than the average bit rate and records readout data in the reproducing buffer memory, when reproducing data from the reproducing area;

reads data stored in said reproducing buffer memory at a specific bit rate therefrom and outputs readout data to a display when recording data on the recording area, reproducing data from the reproducing area or accessing of said recording/reproducing head between the recording area and the reproducing area;

said control unit reproduces the data at an average bit rate higher than an average bit rate of the video data when recording of video data is performed before reproducing of data and equalizes an average bit rate of the reproduced video data to an average bit rate of the input video data, when a reproduction position on the disk coincides with a recording position on the disk or when an input video picture and a reproduced video picture coincides with each other on a time axis; and wherein the control section sets the recording speed at which data is recorded onto the recording medium at T1+T2+2S(N+1))A/T1 (bps) or higher, and the reproducing speed at which data is reproduced from the recording medium at $T1+T2+2S(N+1))B/T2$ (bps) or higher, where T1 is the average recording time period per one recording operation, T2 is the average reproducing time period per one reproducing operation, S seconds is the maximum access time period for the recording medium which is determined by adding a time period required for rotating the recording medium by one rotation, to a seek time period for the recording/reproducing head to move from an innermost circumference of the recording medium to an outermost circumference thereof, A(bps) is the bit rate of inputted data, B (bps) is a bit rate of reproduced video data, and N is a maximum number of times or retries to be performed upon a failure of seeking, when recording onto the recording area and reproducing from the recording area are alternately performed in the time sharing manner.

20. A disk apparatus for recording and reproducing data on a disk recording medium using a recording/reproducing head, comprising:

a recording buffer memory configured to temporarily store input data;

a reproducing buffer memory configured to temporarily store data reproduced from the recording medium;

a control unit configured to control alternately in time sharing, recording of data on a specific recording area on the recording medium and reproducing of data from a specific reproducing area on the recording medium wherein said control unit writes the input data in said recording buffer memory when recording data on the recording area reproducing data from the reproducing area or accessing said recording/reproducing head between the recording area and the reproducing area, reads data stored in said recording buffer memory at a recording speed twice or more than an average bit rate of the input data and records readout data in the recording area, when recording data in the recording area;

reads data stored in the reproducing area at a reproducing speed twice or more than the average bit rate and records readout data in the reproducing buffer memory, when reproducing data from the reproducing area;

reads data stored in said reproducing buffer memory at a specific bit rate therefrom and outputs readout data to a display when recording data on the recording area, reproducing data from the reproducing area or accessing of said recording/reproducing head between the recording area and the reproducing area, said control unit reproduces the data at an average bit rate higher than an average bit rate of the video data, when recording of video data is performed before reproducing of data, and equalizes an average bit rate of the reproduced video data to an average bit rate of the input video data, when a reproduction position on the disk coincides with a recording position on the disk or when an input video picture and a reproduced video picture coincides with each other on a time axis; and wherein the control means sets a total of memory capacities of the buffer memory, for storing digital continuous data to be recorded and to be reproduced, to $2S(N+1)A$ bits$+(2S(N+1)+T1)B$ bits or more, where T1 is the average recording time period per one recording operation, T2 is the average reproducing time period per one reproducing operation, S (seconds) is the maximum access time period necessary for the recording medium decided by adding a time period required for the recording/reproducing head to move from an innermost circumference of the recording medium to an outermost circumference thereof, A (bps) is an average bit rate of the inputted digital continuous data, B is an average bit rate of the continuous video data to be reproduced, and N is a maximum number of retries to be performed upon a failure of seeking, when recording onto the recording area and reproducing from the recording area are alternately performed in the time sharing manner.

* * * * *